United States Patent [19]

Oberstein et al.

[11] Patent Number: 4,543,565
[45] Date of Patent: Sep. 24, 1985

[54] METHOD AND APPARATUS FOR MONITORING AN ALARM SYSTEM

[75] Inventors: Karla Oberstein; Peer Thilo, both of Munich, Fed. Rep. of Germany

[73] Assignee: Siemens Aktiengesellschaft, Berlin & Munich, Fed. Rep. of Germany

[21] Appl. No.: 375,318

[22] Filed: May 5, 1982

[30] Foreign Application Priority Data

Jun. 12, 1981 [DE] Fed. Rep. of Germany ....... 3123451

[51] Int. Cl.⁴ .............................................. G08B 29/00
[52] U.S. Cl. .................... 340/506; 340/511; 340/518; 340/661
[58] Field of Search ........ 340/506, 500, 501, 507–512, 340/517, 518, 521, 524–526, 531, 532, 537, 657, 660–664, 870.01, 870.09, 870.17, 870.16, 825.09–825.13; 307/358; 328/162; 364/550

[56] References Cited

U.S. PATENT DOCUMENTS

| 4,222,041 | 9/1980 | Von Tomkewitsch et al. ... | 340/506 |
| 4,263,583 | 4/1981 | Wyckoff ............................... | 340/501 |
| 4,283,717 | 8/1981 | Caldwell et al. ..................... | 340/506 |
| 4,313,114 | 1/1982 | Lee et al. ......................... | 340/870.16 |

Primary Examiner—Donnie L. Crosland
Attorney, Agent, or Firm—Hill, Van Santen, Steadman & Simpson

[57] ABSTRACT

A method and apparatus for monitoring an alarm system such as a fire alarm system having a plurality of alarms connected to a central station determine the amount of departure of measured alarm values from a rated quiescent value and calculate a fluctuation value therefrom, the fluctuation value then being compared at selected time intervals with a rated limiting value. If the result of the comparison shows that the fluctuation value is less than the rated limiting value, a malfunction signal is displayed.

11 Claims, 5 Drawing Figures

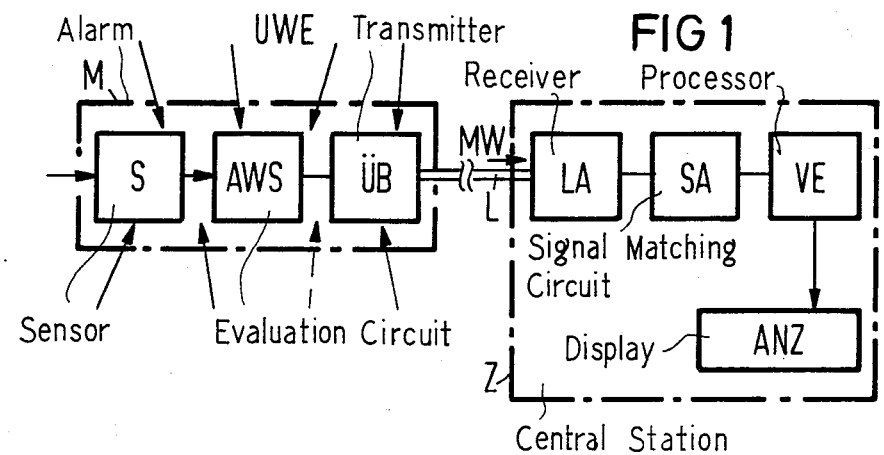
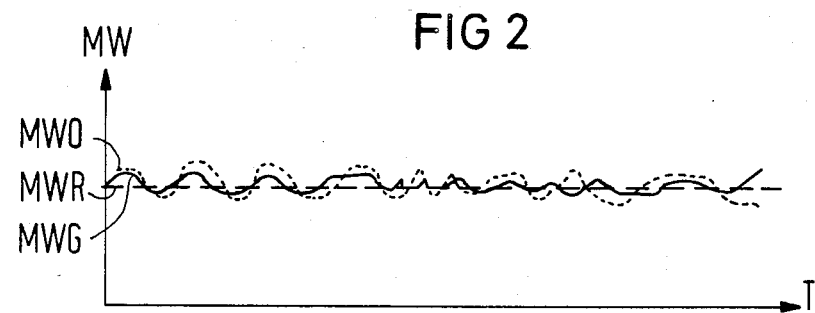
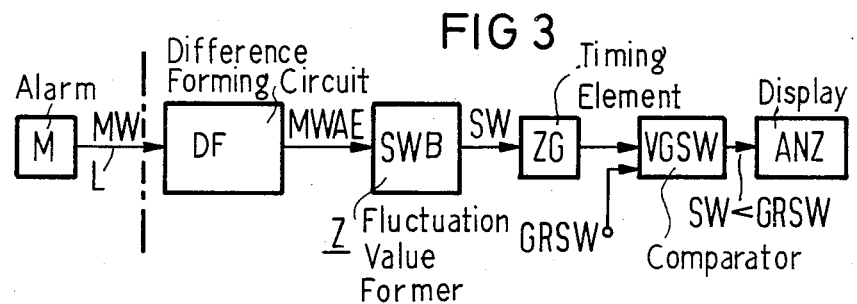

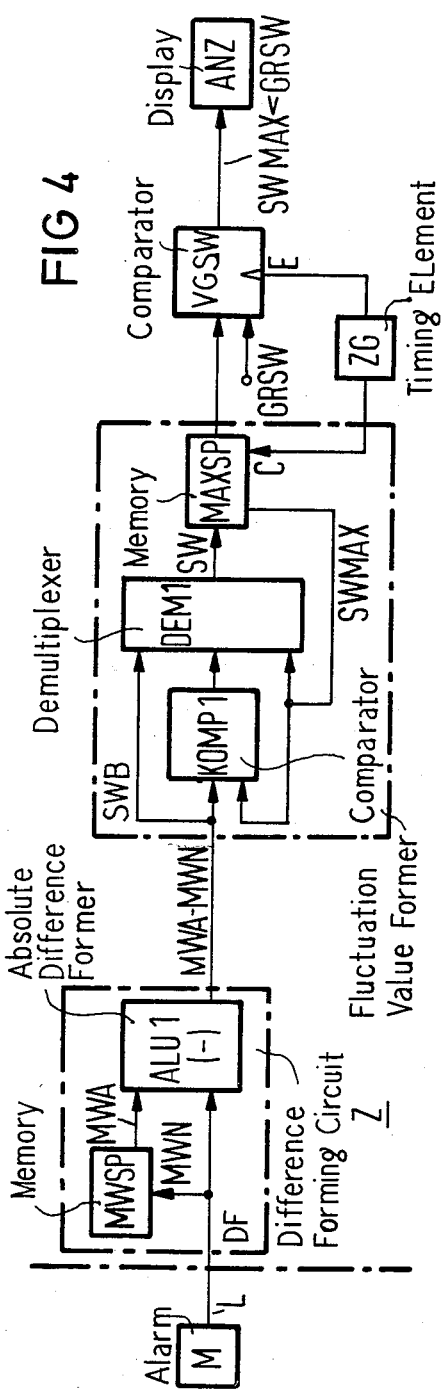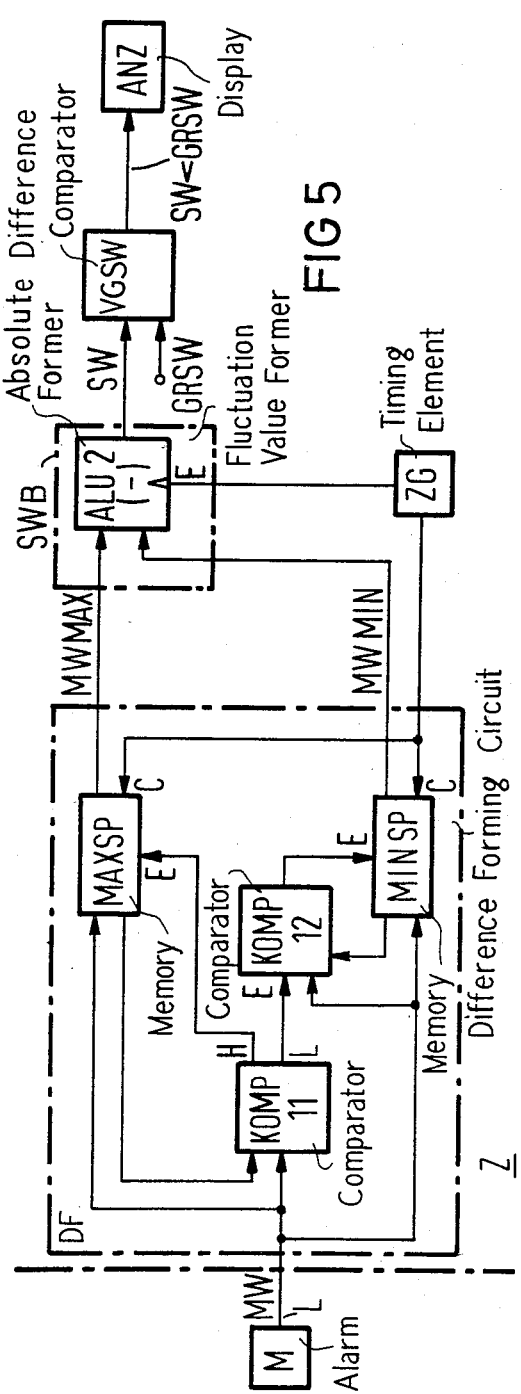

METHOD AND APPARATUS FOR MONITORING AN ALARM SYSTEM

BACKGROUND OF THE INVENTION

1. Field of the Invention

The present invention relates to methods and devices for monitoring alarm systems, and in particular to a method and apparatus for monitoring an alarm system for determining whether an alarm in the system has inadvertently become isolated from the environment it is intended to protect.

2. Description of the Prior Art

Danger alarm systems must function with a high degree of reliability requiring that non-functional alarm units within the alarm system must be quickly recognized and indicated as such. This is particularly true for automatic alarm systems such as fire alarm systems. In addition to disruptions which simulate alarm conditions and falsely cause the generation of an alarm signal, other types of alarm malfunctions are possible. One such type of malfunction is that an alarm may be correctly connected to an alarm line and emit a correct signal in its quiescent state, however, the evaluation circuitry associated therewith may malfunction so that upon the occurrence of a true alarm condition the quiescent signal emitted from the alarm unit is not changed into a alarm signal, and thus no alarm indication occurs at the central station.

Another possible malfunction is that an alarm unit may be properly connected to an alarm line, however the alarm unit may for some reason become isolated from its environment as a result of a high degree of contamination or as a result of an uncorrected structural change in the alarm unit itself. This may occur, for example, when painting is being done in the area monitored by an alarm unit, during which it is customary to cover items such as alarm units with a plastic or other covering material so as to avoid paint spattering thereon. Such a covering may inadvertently be left on the alarm unit thereby isolating the alarm unit from its environment so that the alarm unit cannot emit an alarm signal when alarm conditions occur.

Conventional alarm systems as described, for example, in U.S. Pat. No. 4,222,041, generally include a special monitoring circuit for monitoring the individual components of the alarm system and emitting a fault or malfunction signal to the central station when a particular malfunction is detected. A theoretically complete monitoring system which has the ability to detect each of the large variety of malfunction possibilities is generally not utilized because of the considerable equipment outlay necessary to adequately monitor all possible faults. Conventional alarm systems, for this reason, therefore generally require periodic visual inspections of the alarm units in order to determine a malfunction such as the type described above wherein the alarm unit is physically isolated from its environment. Depending upon the frequency of such visual inspections, an alarm unit may remain isolated from its environment for some time before the problem is discovered, during which time the alarm unit cannot function to monitor its assigned area for danger conditions.

SUMMARY OF THE INVENTION

It is an object of the present invention to provide a method and apparatus for automatically monitoring an alarm system to detect individual alarm units which are fully functional but which are isolated from their environment.

The above object is inventively achieved in a method and apparatus which determine the difference between successive measured values received from a particular alarm unit in a quiescent state and forming a fluctuation value from the difference. The fluctuation value is compared at selected time intervals to a rated limit value, and a fault indication is displayed if the fluctuation is less than the limit value.

The method and apparatus disclosed herein make use of the fact that measured values from individual alarm units exhibit static fluctuations as a result of normal environmental influences over a period of time. If these fluctuations are less than a characteristic threshold, or are entirely absent, this indicates that the alarm unit has become isolated from its environment. The individual alarm units are cyclically sampled in their quiescent states so as to continually transmit measured values to a central station which may, for example, be there evaluated as analog signals. Changes in the measured values are themselves measured and a respective fluctuation value for each alarm unit is derived therefrom. In all instances environmentally-caused fluctuation values are larger than fluctuation values of an alarm which is isolated from its environment, such as by being covered. An alarm unit which is effectively closed to the environment will exhibit only a minimum fluctuation value slightly above and below a theoretical quiescent value in contrast to a properly functioning alarm unit which is open to the environment which will exhibit larger fluctuations due to normal temperature changes, slight air flows, normal changes in the particulate content of the air, and the like. The fluctuation value for a particular alarm unit is updated upon each sampling of the alarm unit and is compared to a predetermined rated limiting value at selected time intervals by means of a timing element. The rated limiting value corresponds to the minimum fluctuation value which is expected from a properly functioning alarm unit open to the environment. If the measured fluctuation value for a particular alarm unit is less than or equal to the rated limiting value, this indicates that the alarm unit has in some manner become isolated from the environment and a malfunction signal is accordingly displayed.

In one embodiment of the method and apparatus, the change in the measured value from a particular alarm is formed from a current measured value which is written in a measured value memory and from the next successive alarm value which is received from the alarm unit during the course of the sampling cycle. The absolute value of the difference between the stored measured value and the just-received measured value is determined by subtraction and is further processed to form a current fluctuation value. The current fluctuation value is then compared to a stored maximum fluctuation value, and the greater of the two fluctuation values is then written in a memory for maximum fluctuation values. The maximum fluctuation value is then retrieved from the fluctuation value memory at selected time intervals controlled by a timing element and is compared to the rated limiting value for such fluctuations. If the retrieved fluctuation value is less than the rated value, a malfunction is indicated. This method and apparatus for monitoring the alarm units in the alarm system has the further advantage that the quiescent signals which are utilized as the measured values from the individual alarm units, and which are constantly emitted by the alarm units, must be conducted through all components of the alarm unit, through all of the transmission devices, and through all components of the central station in order to be monitored and compared to the rated fluctuation value. This method and apparatus of monitoring an alarm system thus will also detect malfunctions in any of the components in the route of the quiescent signal because if, as a result of a malfunction of one of those components, no quiescent signal is produced, the fluctuation value for two successive samplings of the alarm unit will be zero, and a malfunction display will therefore be generated.

In a second embodiment of the invention, two memories are employed for determining the measured value changes and for forming the maximum fluctuation value. A maximum fluctuation value is stored in one memory and a minimum fluctuation value is stored in the other memory. During each sampling cycle, a current measured value is compared to the value in the memory containing the maximum fluctuation value and, if the current measured value is less than the stored maximum fluctuation value, the current measured value is compared to the value in the minimum fluctuation value memory. If the current measured value is greater than the maximum fluctuation value, the current measured value then replaces the contents of the maximum fluctuation memory and is now utilized as the maximum fluctuation value for the next sampling cycle. Similarly, if the measured value is less than the value in the minimum fluctuation value memory, the current measured value replaces that stored value and becomes the minimum fluctuation value for the next sampling cycle. The difference between the respective values contained in the maximum and minimum fluctuation value memories is then utilized as the fluctuation value which is compared to the rated limiting value in order to determine whether the alarm unit is isolated from its environment. The comparison is undertaken at selected time intervals which may, for example, be a number of hours.

BRIEF DESCRIPTION OF THE DRAWINGS

FIG. 1 is a block diagram of a fire alarm system in which the inventive method and apparatus may be utilized.

FIG. 2 is a graphic representation of measured values received from an alarm unit over a period of time for illustrating the operation of the method and apparatus disclosed herein.

FIG. 3 is a block diagram of an apparatus constructed in accordance with the principles of the present invention which operates in accordance with the inventive method disclosed herein.

FIG. 4 is a more detailed block diagram of a first embodiment of the apparatus shown in FIG. 3.

FIG. 5 is a more detailed block diagram of a second embodiment of the apparatus shown in FIG. 3.

DESCRIPTION OF THE PREFERRED EMBODIMENTS

The essential elements associated with one alarm unit in a typical alarm system, such as a fire alarm system, are shown in FIG. 1. The alarm system may contain any number of individual alarm units M, each of which has a sensor S, an evaluation circuit AWS, and a transmitter UB. Each alarm unit M is normally exposed to the environment UWE. Each alarm unit M continuously transmits signals corresponding to alarm measured values MW via a line L to a central station Z. The line L feeds a receiver LA which is connected to a signal matching circuit SA for supplying the measured values MW to a processor VE. The processor VE may contain a multiplexer means for cyclically sampling measured values from each of the alarm units M in the system. The processor VE is connected to a display unit ANZ at which the status of each alarm unit M can be displayed.

The graph shown in FIG. 2 is an exemplary plot of measured values MW for a single alarm unit, on the vertical axis, versus time T on the horizontal axis. The measured values MW represent quiescent measured values, that is, measured values received during non-alarm conditions. The dashed straight line MWR represents a theoretical quiescent measured value level which the alarm unit being monitored should exhibit when at rest. In practice, however, an operative alarm unit exhibits a quiescent measured value curve MWO which meanders slightly above and below the theoretical curve MWR. These normal fluctuations are caused by the fact that the alarm unit is open to the environment and is therefore susceptible to temperature fluctuations, slight air flows, and normal changes in the particulate content of the air. If the alarm unit for some reason becomes isolated from its environment, the fluctuations about the theoretical value MWR will become smaller, as indicated by the curve MWG. Some fluctuation is still present as a result of thermal noise, however, fluctuations normally caused by slight changes in the environment will be absent. Thus, if the statistical fluctuation values from a particular alarm unit fall below a theoretically determined value, this is an indication that the alarm unit is no longer open to its environment in its quiescent state. This characteristic of the alarm unit is utilized in the inventive method and apparatus described in greater detail below to identify an alarm unit which has become isolated from its environment.

A basic block diagram showing an apparatus constructed in accordance with the principles of the present invention for practicing the method disclosed herein is shown in FIG. 3. All elements to the right of the dot and dash line are located at the central station Z. As shown in FIG. 3, an alarm unit M, constructed as shown in FIG. 1, transmits measured value signals MW via an alarm line L to a difference forming circuit DF. The difference forming circuit DF determines the difference MWAE between two selected measured values received from the same alarm unit M and transmits the difference MWAE to a fluctuation value former SWB. The fluctuation value former SWB determines the fluctuation value SW at a particular point in time for the alarm unit M, as described in greater detail below, and supplies the fluctuation value SW to a comparator VGSW through a timing element ZG. The comparator VGSW compares the fluctuation value SW with a rated limiting value GRSW and if the fluctuation value SW is less than the rated value GRSW supplies a malfunction signal to a display unit ANZ, indicating that the particular alarm M being monitored has become isolated from its environment.

A first embodiment for realizing the device shown in FIG. 3 is illustrated in FIG. 4, where again all elements to the right of the dot and dash line are located at the central station Z. In the embodiment of FIG. 4, the difference forming circuit DF contains a memory MWSP into which a current measured value MWN received from an alarm M via the alarm line L is written. The current measured value MWN is also supplied to an absolute difference former ALU1 which calculates the absolute value of the difference between the current measured value MWN and the most recent measured value MWA which was received before MWN and which was also stored in the memory MWSP. The output of the absolute difference former ALU1 (MWA-E=|MWA−MWN|) is supplied to a comparator KOMP1 in the fluctuation value former SWB. The difference MWAE is compared in the comparator 1 with the maximum measured value difference MWMAX, which is stored in a memory MAXSP. In the first sampling cycle, the memory MAXSP has a contents of zero and the memory MWSP in the difference forming circuit DF contains the current measured value MWN. During each further sampling cycle, the difference MWAE is compared to the maximum difference value MWMAX from the memory MAXSP. The greater of the two values is then written into the memory MAXSP as the new maximum difference value SWMAX. The decision as to whether to inscribe the current difference value MWAE or the previous difference maximum value SWMAX in the memory MAXSP as the new maximum difference value is undertaken by a demultiplexer DEM1.

The output of the memory MAXSP also serves as the output of the fluctuation value former at which the fluctuation value occurs. This fluctuation value is supplied to the comparator VGSW which is controlled by a timing element ZG. The timing element ZG is also connected to a reset input C of the memory MAXSP for resetting the contents of the memory MAXSP to zero upon a signal from the timing element ZG. At prescribed time intervals the timing element ZG supplies a signal to an enabling input E of the comparator VGSW at which time the current contents of the memory MAXSP are compared with a rated limiting value GRSW in the comparator VGSW, and the contents of the memory MAXSP are then reset to zero. If the maximum fluctuation value SWMAX is less than the rated value GRSW, a malfunction signal is displayed on a display unit ANZ connected to the comparator VGSW. The measured value memory MWSP and the absolute difference former ALU1 constitute a means for determining the measured value difference MWAE, and the comparator KOMP1 and the demultiplexer DEM1 constitute a means for forming the fluctuation value SW.

A second embodiment for practicing the method disclosed and claimed herein is shown in FIG. 5 wherein again all elements to the right of the dot and dash line are located at the central station Z. In the embodiment shown in FIG. 5, a maximum measured value difference and a minimum measured value difference are determined and utilized for calculating the fluctuation value, in contrast to the embodiment of FIG. 4 wherein two successive alarm measured values are utilized.

As shown in FIG. 5, the difference forming circuit DF contains a maximum alarm measured value memory MAXSP and a minimum alarm measured value memory MINSP. At the beginning of a first sampling cycle, the contents of the maximum alarm measured value memory MAXSP is set to zero by a signal from the timing element ZG supplied to a reset input C of the memory MAXSP, and the memory MINSP is set to a greatest possible measured value which is also accomplished by a signal from the timing element ZG supplied to a reset input C of the memory MINSP.

During each sampling cycle, a current measured value MW received from the alarm unit M is first compared with the contents of the memory MAXSP in a comparator KOMP11. If the comparison shows that the just-received alarm measured value MW is greater than the maximum alarm value MWMAX, which is the contents of the memory MAXSP, the comparator KOMP11 emits a high signal H to an enabling input E of the memory MAXSP and the current alarm measured value MW is inscribed therein as the new maximum MWMAX. If the result of the comparison shows that the current measured value MW is less than the maximum measured value MWMAX, the comparator KOMP11 supplies a low signal L to an enabling input E of a second comparator KOMP12 and the current measured value MW is compared therein with the current contents of the minimum measured value memory MINSP. If the result of the second comparison in the second comparator KOMP12 shows that the current measured value MW is less than the current measured value minimum MWMIN, which is the contents of the memory MINSP, the comparator KOMP12 supplies a signal to an enabling input E of the memory MINSP and the current measured value MW is inscribed therein as the new measured value minimum MWMIN.

The outputs of the memories MAXSP and MINSP are connected to an absolute difference former ALU2 in the fluctuation value former SWB. Upon receipt of a signal from the timing element ZG supplied to an enabling input E of the absolute difference former ALU2, the absolute difference between the maximum measured value MWMAX and the minimum measured value MWMIN is calculated, which difference is utilized as the fluctuation value SW. The timing element ZG simultaneously resets the memories MAXSP and MINSP to their respective initial values identified above after each enablement of the absolute difference former ALU2.

The fluctuation value SW is supplied to the comparator VGSW for comparison therein with the rated limiting value GRSW. If the fluctuation value SW is less than the rated limiting value GRSW, a display unit ANZ displays a malfunction signal indicating that the alarm unit M is isolated from its environment. The length of time between successive enablements of the absolute difference former ALU2 may be selected in order to accommodate various conditions and requirements, however, a period between enablements in the range of hours will give greater assurance that truely representative maximum and minimum values are respectively stored in the memories MAXSP and MINSP, rather than localized values which may result if a relatively short period is utilized.

All of the elements at the central station Z in the embodiments shown in FIGS. 4 and 5 can be realized as a microcomputer.

Although modifications and changes may be suggested by those skilled in the art it is the intention of the inventors to embody within the patent warranted hereon all changes and modifications as reasonably and properly come within the scope of their contribution to the art.

We claim as our invention:
1. A method for monitoring a plurality of alarm units in an alarm system, each of said alarm units continu- ously emitting quiescent measured values, comprising the steps of:

cyclically sampling said luminescent measured values for each of said alarm units;
calculating a fluctuation value from successive measured values for each alarm unit representing the change in magnitude of said successive measured values;
storing a rated limiting value in a memory;
comparing said fluctuation value at selected time intervals with said rated limiting value; and
displaying a malfunction signal for an alarm unit if said fluctuation value for the alarm unit is less than said rated limiting value.

2. The method of claim 1 wherein the step of calculating a fluctuation value for an alarm unit comprises the steps of:

calculating the absolute value of the difference between successive measured values of an alarm unit;
comparing said absolute value of said difference to a maximum fluctuation value;
utilizing said absolute value of said difference as a new maximum fluctuation value if said absolute value of said difference is greater than said maximum fluctuation value with which said absolute value of said difference is compared; and
utilizing the maximum fluctuation value resulting from the comparison as said fluctuation value for comparing with said rated limiting value.

3. The method of claim 1 wherein said step of calculating said fluctuation value comprises the steps of:

comparing a measured value from an alarm unit with a maximum measured value;
utilizing said measured value as a new maximum measured value if said measured value is greater than the maximum measured value with which said measured value was compared;
comparing said measured value with a minimum measured value if said measured value is less than said maximum measured value;
utilizing said measured value as a new minimum measured value if said measured value is less than said minimum measured value with which said measured value was compared;
calculating the absolute value of the difference between said maximum measured value and said minimum measured value at said selected time intervals; and
utilizing said absolute value of said difference between said maximum measured value and said minimum measured value as said fluctuation value for comparing to said rated limiting value.

4. An apparatus for monitoring an alarm system having a plurality of alarm units therein, each of said alarm units continuously emitting a measured value corresponding to the quiescent state of an alarm unit, said apparatus comprising for each alarm unit:

means for determining changes in the magnitude between two selected measured values emitted by an alarm unit;
means for determining a fluctuation value from said measured value changes by comparing the magnitude of said measured value changes to at least one stored value;
means for storing a rated limiting value;
means for comparing said fluctuation value with said rated limiting value; and
means for displaying a malfunction signal if said fluctuation value is less than said rated limiting value.

5. The apparatus of claim 4 wherein said means for determining the magnitude of selected measured values emitted by an alarm unit is a means for determining the absolute value of the difference between successive measured values received from an alarm unit.

6. The apparatus of claim 5 wherein said means for determining the absolute value of the difference between successive measured values comprises:

a first memory for storing said measured values; and
an absolute difference former connected to said memory for subtracting a current measured value from a measured value stored in said memory immediately preceding said current measured value and forming the absolute value of the difference.

7. The apparatus of claim 6 wherein said means for determining said fluctuation value comprises:

a second memory in which a maximum fluctuation value is stored;
a second comparator connected to said absolute difference former and to said second memory for comparing said absolute value of said difference to said maximum fluctuation value; and
means interconnected between said second comparator and said second memory for inscribing said absolute value of said difference in said second memory as a new maximum fluctuation value if said absolute value of said difference is greater than the maximum fluctuation value with which said absolute value of said difference was compared in said second comparator, said second memory having an output connected to said comparator, whereby said maximum fluctuation value is utilized as said fluctuation value for comparing with said rated limiting value in said comparator, and wherein said apparatus further comprises means for resetting the contents of said second memory to zero after said fluctuation value is compared with said rated limiting value.

8. The apparatus of claim 7 wherein said means interconnected between said second comparator and said second memory is a demultiplexer.

9. The apparatus of claim 4 wherein said means for determining changes in the magnitude between selected measured values is a means for identifying a maximum measured value and a minimum measured value.

10. The apparatus of claim 9 wherein said means for identifying a maximum measured value and a minimum measured value comprises:

a first memory having a maximum measured value stored therein;
a second comparator connected to an alarm unit and to said first memory for comparing a current measured value emitted by said alarm unit with said maximum measured value, said first memory being connected to said alarm unit and said first comparator supplying an enabling signal to said first memory if said current measured value is greater than said maximum measured value for inscribing said current measured value in said first memory as a new maximum measured value;
a second memory having a minimum measured value stored therein;
a third comparator connected to said alarm unit and to said second comparator, said second comparator supplying an enabling signal to said third comparator if said current measured value is less than said maximum measured value, said enabling signal enabling said third comparator for comparing said current measured value with said minimum measured value, said second memory being connected to said alarm unit and said third comparator supplying an enabling signal to said second memory if said current measured value is less than said minimum measured value for inscribing said current measured value in said second memory as a new minimum measured value.

11. The apparatus of claim 10 wherein said means for determining said fluctuation value comprises:

an absolute difference former connected to respective outputs of said first and second memories for determining the absolute value of the difference between said maximum measured value and said minimum measured value, said absolute value of said difference being utilized as said fluctuation value, and wherein said apparatus further comprises a means for enabling said absolute difference former at said selected intervals and for resetting the contents of said first memory to zero and the contents of said second memory to a selected maximum possible measured value after said absolute difference former is enabled.

* * * * *